March 15, 1932.  A. W. EVERETT  1,849,423
TOOL JOINT
Filed Sept. 19, 1928
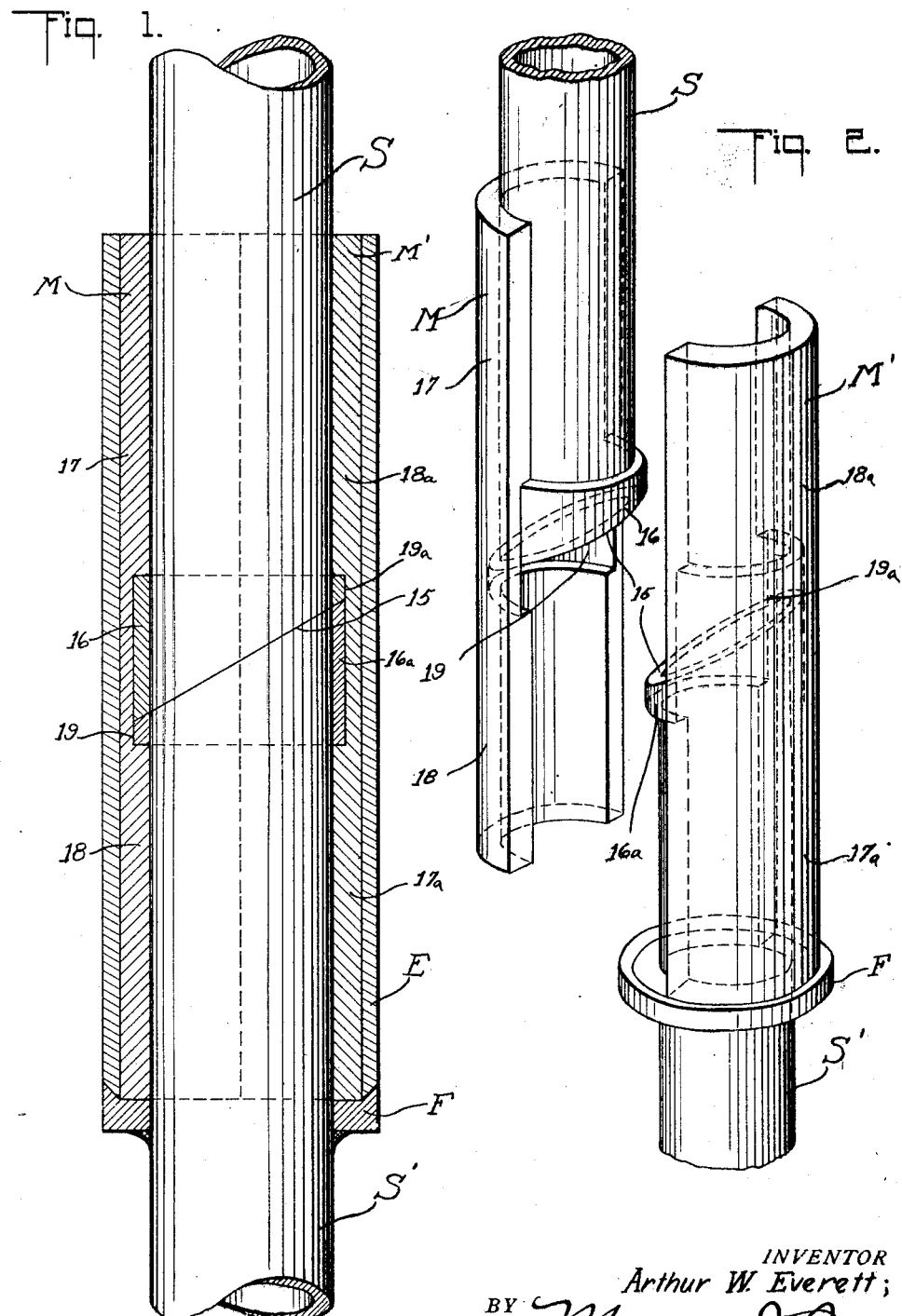
INVENTOR
Arthur W. Everett;
BY Munn &
ATTORNEY Patented Mar. 15, 1932

1,849,423

UNITED STATES PATENT OFFICE

ARTHUR W. EVERETT, OF LOS ANGELES, CALIFORNIA

TOOL JOINT

Application filed September 19, 1928. Serial No. 306,950.

My invention relates generally to pipe couplings and specifically to tool joints for rotary drill pipe as used in oil wells.

It is the purpose of my invention to provide a tool joint by which the adjoining sections of a rotary drill pipe can be readily coupled and uncoupled, and when coupled are locked against relative rotation in either direction, thus permitting rotation of the drill pipe as a whole in either direction, so that should it be necessary to rotate the drill pipe in the opposite direction to which it is rotated when drilling, such for example as when attempting to release a bit locked in the well it can be accomplished without uncoupling the pipe sections.

I will describe only one form of tool joint embodying my invention, and will then point out the novel features thereof in claims.

In the accompanying drawings;

Fig. 1 is a view showing in vertical section one form of tool joint embodying my invention in applied position to the meeting ends of a pair of rotary drill pipe sections; and Fig. 2 is a perspective view showing the two parts of the tool joint in uncoupled position.

In carrying out my invention I provide a tool joint which in part is an integral part of the drill pipe sections which it couples. The upper pipe section S and the lower pipe section S' have their confronting ends beveled as indicated at 15, and such ends are provided at their confronting sides with semi-circular collars 16 and 16ª, respectively, disposed exteriorly of the pipe sections and likewise beveled at their outer edges so as to provide a liquid tight joint when the pipe ends are arranged as illustrated in Fig. 1.

Secured to or formed integral with the pipe sections S and S' and on the outer surfaces thereof so as to extend and occupy the space between the collars 16 and 16ª are elongated members M and M', respectively, each of semi-circular form in cross section so that when assembled in the coupling of the pipe sections they produce a tube within which the ends of the pipe sections are disposed. The members are made up of an attached portion 17 and 17ª, and a projecting portion 18 and 18ª, each projecting in the sense that it extends beyond the end of the pipe section so as to embrace the other pipe section when the two pipe sections are presented to each other in sidewise relation so that its edges abut or at least confront the edges of the attached portion of the other member.

The projecting portions 18 and 18ª are recessed on their confronting sides to form semi-circular grooves 19 and 19ª, respectively, having the same beveled contour as the collars 16 and 16ª so that each groove may receive the collar of the other pipe section when the ends of the pipe sections are in confronting relation as illustrated in Fig. 1. The collars may be described as tongues in that when within the grooves they function to secure the pipe sections against endwise displacement.

To secure the members M and M' against lateral displacement after they have been once applied as shown in Fig. 1, a sleeve E is provided having an inside diameter permitting a sliding fit thereof on the members and to span the latter in such manner that neither projecting portion can move laterally outward from the other pipe section thereby securing the tool joint against lateral uncoupling and maintaining the collars within the grooves to prevent endwise uncoupling. As a consequence the tool joint as a whole is locked by the sleeve in coupling position thus securing the pipe sections in coupled relation. In applying the sleeve it is slid downwardly on the upper pipe section until it abuts a limiting flange F on the pipe section S' when the sleeve will have assumed an encompassing position with respect to the members M and M' thereby securing the joint in coupling position.

By virtue of the beveled pipe ends or collars, the weight of the upper pipe section and those above are utilized to force the collars into the grooves and thereby produce a more secure locking as well as a better joint between the pipe ends.

To uncouple the joint from the coupled position shown in Fig. 1, it is only necessary to slide the sleeve E upwardly until it is free of the members M and M' when the two can be moved laterally to remove the collars from the grooves thereby permitting disconnection of the pipe sections.

By reason of the construction and the manner in which the two parts of the joint are assembled, it will be manifest that it serves to secure the pipe sections against rotation relatively so that should the lower section become locked against rotation in one direction because of the drill bit becoming locked in the well, the drill pipe can be rotated in the opposite direction in an attempt to release the drill bit and without uncoupling the pipe sections as would be the case with tool joints as heretofore constructed.

What I claim is:

1. In combination, a pair of pipe sections, a pair of members one for each of the sections having an attaching portion secured thereto and a projecting portion extending from the end portion thereof, both of said portions being of arcuate form in cross section, collars on the ends of the pipe sections, and grooves in the projecting portions for receiving the collars, the pipe ends, collars and grooves being of beveled form, and a sleeve removably fitted on the members and embracing the latter to secure them against lateral displacement.

2. A combination as embodied in claim 1 wherein a flange is provided on one of the pipe sections for limiting movement of the sleeve in one direction on the members.

3. A combination as embodied in claim 1 wherein the members are of semi-circular form in cross section so that they coact to wholly embrace the pipe sections.

4. In combination, a pair of drill pipe sections, members fixed to the outer periphery of and projecting from the confronting ends of the pipe sections, said members when assembled forming a tube spanning the ends of the pipe sections, grooves in the confronting faces of the members, collars fixed on the pipe section ends so that the collar for one pipe section is received in the groove for the member of the other pipe section, and a tubular sleeve slidably mounted on the members when assembled for securing the latter against separation.

ARTHUR W. EVERETT.